H. L. SIMONSON & A. R. SIMONSON.
Improvement in Dinner Pails.

No. 124,019. Patented Feb. 27, 1872.

UNITED STATES PATENT OFFICE.

HENRY L. SIMONSON AND ABRAHAM R. SIMONSON, OF GRANITEVILLE, N. Y.

IMPROVEMENT IN DINNER-PAILS.

Specification forming part of Letters Patent No. 124,019, dated February 27, 1872.

Specification describing an Improvement in Dinner-Pails, invented by HENRY L. SIMONSON and ABRAHAM R. SIMONSON, of Graniteville, in the county of Richmond, State of New York.

Dinner-pails have been before known with lamps below to keep their contents hot; but all require separate dippers to obtain the coffee or other drink therein, and in practice, the necessity for such dipping accessories goes far to discourage their use. We have, by combining with the pail a hinged lamp capable of turning freely and so mounted that its gravity keeps it always upright, made it easy and safe for the workman to drink directly from the pail, inclining the latter to any extent which becomes necessary, while the lamp remains ready to resume its functions of heating so soon as the pail is again restored to an upright position.

The following is a description of what we consider the best means of carrying out our invention. The accompanying drawing forms a part of this specification.

Figure 1:
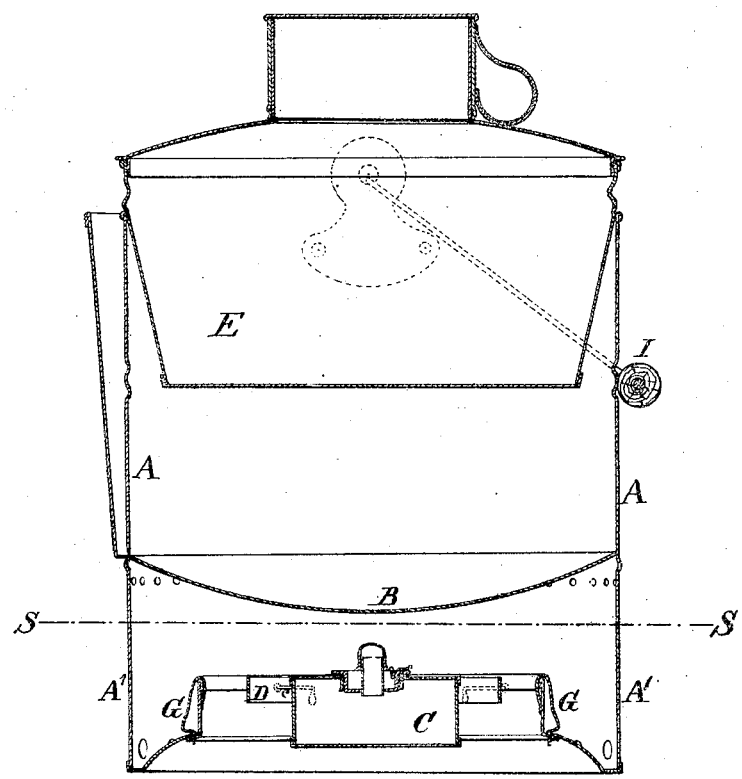
Figure 2:
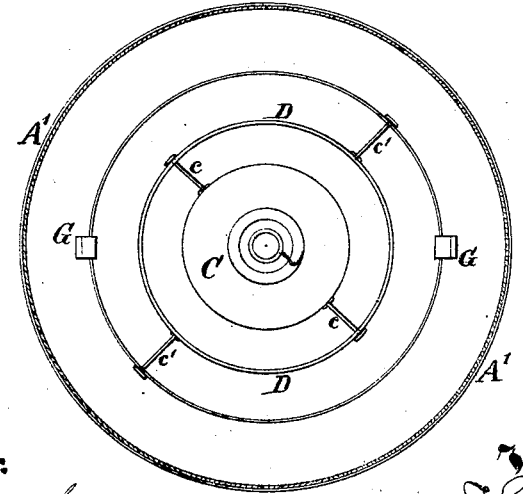

Figure 1 is a central vertical section, and Fig. 2 is a horizontal section on the line S S, in Fig. 1.

Similar letters of reference indicate like parts in all the figures.

A A' is the main body of the pail, of ordinary tin-ware. It may be an ordinary five-pints pail in its general dimensions, but we prefer a form of a little smaller diameter and a greater height. It is divided horizontally a little above its base by a partition, B. The portion above this partition B we will designate A. It forms a tight pail adapted to hold coffee or other drinks. The portion below the partition B we will designate A'. It is perforated with two series of holes at different levels. C is a lamp, having a small wick-tube or provisions for adjusting the wick so as to make a very small flame. This lamp is hung in a gimbal-ring, D, by pivots $c$ $c$ $c'$ $c'$ so that it can tilt freely. It can be removed and replaced at will by operating spring catches G. That attachment is similar to one very commonly employed in lanterns. E is a deep, slightly-conical vessel, which sits into the top of the pail to carry any solid food, while the main body of the pail carries the drink. The top, and all the rest, may be made in any approved or suitable manner. The bail I may be hinged to the pail by ears or lugs, as shown, so as to perform its ordinary function, or it may be omitted for some uses altogether.

What we claim as our invention, and desire to secure by Letters Patent, is—

The tight case A and perforated or open-work casing A' below, in combination with a tilting-lamp, C, mounted below, and so hung and balanced as to hold itself upright when the pail is inclined, all adapted to serve as and for the purposes herein specified.

In testimony whereof we have hereunto set our names in the presence of two subscribing witnesses.

HENRY L. SIMONSON.
ABRAHAM R. SIMONSON.

Witnesses:
C. C. LIVINGS.
ARNOLD HOERMANN.